(12) United States Patent
Nozoe et al.

(10) Patent No.: US 11,158,852 B2
(45) Date of Patent: Oct. 26, 2021

(54) POSITIVE ELECTRODE MATERIAL FOR LITHIUM-ION SECONDARY BATTERIES, POSITIVE ELECTRODE FOR LITHIUM-ION SECONDARY BATTERIES, AND LITHIUM-ION SECONDARY BATTERY

(71) Applicant: SUMITOMO OSAKA CEMENT CO., LTD., Tokyo (JP)

(72) Inventors: Tsutomu Nozoe, Tokyo (JP); Toyomasa Nakano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 208 days.

(21) Appl. No.: 16/586,361

(22) Filed: Sep. 27, 2019

(65) Prior Publication Data

US 2020/0313172 A1    Oct. 1, 2020

(30) Foreign Application Priority Data

Mar. 28, 2019 (JP) .............................. JP2019-063056

(51) Int. Cl.
| | |
|---|---|
| H01B 1/06 | (2006.01) |
| H01M 4/36 | (2006.01) |
| H01M 4/58 | (2010.01) |
| H01M 4/62 | (2006.01) |
| H01M 10/0525 | (2010.01) |
| H01M 4/02 | (2006.01) |

(52) U.S. Cl.
CPC .............. *H01M 4/366* (2013.01); *H01B 1/06* (2013.01); *H01M 4/5825* (2013.01); *H01M 4/625* (2013.01); *H01M 10/0525* (2013.01); *H01M 2004/021* (2013.01); *H01M 2004/028* (2013.01)

(58) Field of Classification Search
CPC .. H01B 1/06; H01B 1/08; H01M 4/36; H01M 4/48; H01M 4/5825; H01M 4/625
See application file for complete search history.

(56) References Cited

U.S. PATENT DOCUMENTS

| | | | | |
|---|---|---|---|---|
| 9,960,423 | B2 * | 5/2018 | Ide | .......................... C30B 29/22 |
| 10,468,677 | B2 * | 11/2019 | Yamaguchi | ......... H01M 10/052 |
| 2013/0052535 | A1 | 2/2013 | Yanagihara et al. | |
| 2013/0122372 | A1 | 5/2013 | Kagei et al. | |
| 2019/0267623 | A1* | 8/2019 | Nozoe | ................... H01M 4/364 |
| 2021/0143421 | A1* | 5/2021 | Mitsumoto | ............ C01G 53/52 |

FOREIGN PATENT DOCUMENTS

| | | |
|---|---|---|
| JP | H11-214003 A | 8/1999 |
| JP | 2010-219065 A | 9/2010 |
| JP | 2012-248378 A | 12/2012 |
| JP | 5997087 B | 9/2016 |
| JP | 2019-149355 A | 9/2019 |
| WO | 2016/158566 A1 | 10/2016 |
| WO | 2018/029745 A1 | 2/2018 |

OTHER PUBLICATIONS

English language machine translation of JP 2012-248378 (pub Dec. 13, 2012).*
Office Action for Japanese Patent Application No. 2019-063056 (dated Nov. 5, 2019).
Search Report for European Patent Application No. 19200132.9 (dated Apr. 9, 2020).

* cited by examiner

*Primary Examiner* — Mark Kopec
(74) *Attorney, Agent, or Firm* — Merchant & Gould P.C.

(57) ABSTRACT

A positive electrode material for lithium-ion secondary batteries, wherein the positive electrode material includes a carbon-coated positive electrode active material which comprises primary particles, secondary particles, and a carbon film, wherein the primary particles and the secondary particles are coated with the carbon film, wherein the primary particles consists of a positive electrode active material in which a strain of the positive electrode active material, which is calculated by X-ray diffraction measurement, is 0.01% or higher and 0.1% or lower, and a ratio (B/A) of a crystallite diameter B (nm) of the positive electrode active material to an average primary particle diameter A (nm) of the carbon-coated positive electrode active material is 0.9 or higher and 1.5 or lower, wherein the particle diameter A is calculated from a specific surface area of the carbon-coated positive electrode active material, wherein the specific surface area is obtained using a BET method.

7 Claims, No Drawings

POSITIVE ELECTRODE MATERIAL FOR LITHIUM-ION SECONDARY BATTERIES, POSITIVE ELECTRODE FOR LITHIUM-ION SECONDARY BATTERIES, AND LITHIUM-ION SECONDARY BATTERY

CROSS-REFERENCE TO RELATED APPLICATIONS

This application claims the benefit of Japanese Patent Application No. 2019-063056 filed Mar. 28, 2019, the disclosure of which is herein incorporated by reference in its entirety.

BACKGROUND OF THE INVENTION

Field of the Invention

The present invention relates to a positive electrode material for lithium-ion secondary batteries, a positive electrode for lithium-ion secondary batteries, and a lithium-ion secondary battery.

Description of Related Art

A lithium-ion secondary battery that is a non-aqueous electrolyte secondary battery can achieve a reduction in size and weight and an increase in capacity and further has excellent properties such as high output and high energy density. Therefore, a lithium-ion secondary batteries has been commercialized not only in an electric vehicle but also as a high-output power supply such as an electric tool. As a positive electrode material for lithium-ion secondary batteries, for example, a material including a granulated body produced using primary particles is known, the primary particles including an electrode active material and a carbon film that coats a surface of the electrode active material.

In lattice defects of primary particles forming an electrode active material, a crystal constituent element is likely to be eluted during charge and discharge, and the reliability during a cycle test or the like deteriorates. Lithium iron phosphate (LFP) prepared using a solid phase method is required to be calcinated at a high temperature in order to reduce lattice defects. When calcination is performed at a high temperature, the crystallite diameter increases, and the specific surface area of primary particles decreases. In addition, when the primary particle diameter excessively increases, an intermediate layer is likely to be formed during charge and discharge, and the reliability of cycle characteristics or the like deteriorates.

On the other hand, Japanese Laid-open Patent Publication No. 2010-219065 discloses an electrode active material having a small crystal strain. However, when the crystal strain is excessively small, diffusion of lithium in a plane direction is not likely to occur, and there is a problem in that the diffusion resistance of lithium increases.

In addition, Japanese Patent No. 5997087 discloses a method of producing a positive electrode material for lithium secondary batteries having a crystallite diameter more than a BET diameter and having a small strain. In Examples, the strain of crystallites was more than 0.1, and a positive electrode material for lithium secondary batteries in which the actual strain of crystallites was 0.1 or less was not able to be prepared.

SUMMARY OF THE INVENTION

The present invention has been made in consideration of the above-described circumstances, and an object thereof is to provide a positive electrode material for lithium-ion secondary batteries having a low diffusion resistance of lithium, a positive electrode for lithium-ion secondary batteries, and a lithium-ion secondary battery.

In order to achieve the object, the present inventors conducted a thorough investigation and found that a positive electrode material for lithium-ion secondary batteries having a low diffusion resistance of lithium can be obtained with the following configuration: the positive electrode material for lithium-ion secondary batteries includes a carbon-coated positive electrode active material that includes primary particles, secondary particles, and a carbon film, the primary particles being formed of a positive electrode active material in which a strain calculated by X-ray diffraction measurement is 0.01% or higher and 0.1% or lower, the secondary particles being agglomerates of the primary particles, and the carbon film coating the primary particles of the positive electrode active material and the secondary particles as the agglomerates of the primary particles, in which a ratio (B/A) of a crystallite diameter B (nm) of the positive electrode active material to an average primary particle diameter A (nm) calculated from a specific surface area of the carbon-coated positive electrode active material that is obtained using a BET method is 0.9 or higher and 1.5 or lower. Based on the findings, the present invention has been completed.

According to the present invention, there is provided a positive electrode material for lithium-ion secondary batteries, wherein the positive electrode material includes a carbon-coated positive electrode active material;

the carbon-coated positive electrode active material comprises primary particles, secondary particles which are agglomerates of the primary particles, and a carbon film, wherein the primary particles and the secondary particles are coated with the carbon film;

the primary particles consists of a positive electrode active material in which a strain of the positive electrode active material, which is calculated by X-ray diffraction measurement, is 0.01% or higher and 0.1% or lower; and a ratio (B/A) of a crystallite diameter B (nm) of the positive electrode active material to an average primary particle diameter A (nm) of the carbon-coated positive electrode active material is 0.9 or higher and 1.5 or lower, wherein the average primary particle diameter A is calculated from a specific surface area of the carbon-coated positive electrode active material, and the specific surface area is a value obtained by a BET method.

A positive electrode for lithium-ion secondary batteries according to the present invention is a positive electrode for lithium-ion secondary batteries, wherein the positive electrode including: an electrode current collector; and a positive electrode mixture layer that is formed on the electrode current collector, in which the positive electrode mixture layer includes the positive electrode material for lithium-ion secondary batteries.

A lithium-ion secondary battery according to the present invention is a lithium-ion secondary battery including: a positive electrode; a negative electrode; and a non-aqueous electrolyte, in which the positive electrode for lithium-ion secondary batteries according to the present invention is provided as the positive electrode.

With the positive electrode material for lithium-ion secondary batteries according to the present invention, the diffusion resistance of lithium can be reduced.

The positive electrode for lithium-ion secondary batteries according to the present invention includes the positive electrode material for lithium-ion secondary batteries according to the present invention. Therefore, the positive electrode for lithium-ion secondary batteries having a low diffusion resistance of lithium can be provided.

The lithium-ion secondary battery according to the present invention includes the positive electrode for lithium-ion secondary batteries according to the present invention. Therefore, the lithium-ion secondary battery can be provided in which the discharge capacity is high and the charge-discharge direct current resistance is low.

DETAILED DESCRIPTION OF THE INVENTION

An embodiment of a positive electrode material for lithium-ion secondary batteries, a positive electrode for lithium-ion secondary batteries, and a lithium-ion secondary battery according to the present invention will be described.

The embodiment will be described in detail for easy understanding of the concept of the present invention, but the present invention is not limited thereto unless specified otherwise.

Positive Electrode Material for Lithium-Ion Secondary Batteries

The positive electrode material for lithium-ion secondary batteries according to the embodiment includes a carbon-coated positive electrode active material that includes primary particles, secondary particles, and a carbon film, the primary particles being formed of a positive electrode active material in which a strain calculated by X-ray diffraction measurement is 0.01% or higher and 0.1% or lower, the secondary particles being agglomerates of the primary particles, and the carbon film coating the primary particles of the positive electrode active material and the secondary particles as the agglomerates of the primary particles, in which a ratio (B/A) of a crystallite diameter B (nm) of the positive electrode active material to an average primary particle diameter A (nm) calculated from a specific surface area of the carbon-coated positive electrode active material that is obtained using a BET method is 0.9 or higher and 1.5 or lower.

Point defects as strains in crystals function as origins of diffusion of lithium in a plane direction and have an effect of reducing a diffusion resistance, the lithium being typically diffused only in one axial direction. However, in a case where strains of crystals are large, when charge and discharge is repeated, a crystal constituent element in a region having strains is likely to be eluted, and the battery capacity decreases. As a result, there is an adverse effect in that the battery capacity decreases with respect to cycle characteristics. On the other hand, in a case where strains of crystals are small, planar diffusion of lithium is not likely to occur. Therefore, the diffusion resistance increases.

The positive electrode material for lithium-ion secondary batteries according to the embodiment includes a carbon-coated positive electrode active material, the carbon-coated positive electrode active material including: a positive electrode active material (primary particles); secondary particles that are agglomerates of the primary particles; and a carbon film (pyrolytic carbon film) that coats surfaces of the primary particles (positive electrode active material) and surfaces of the secondary particles. In addition, the positive electrode material for lithium-ion secondary batteries according to the embodiment includes a granulated body that is produced using the primary particles of the carbon-coated positive electrode active material.

In the positive electrode material for lithium-ion secondary batteries according to the embodiment, the average primary particle diameter of the carbon-coated positive electrode active material is preferably 20 nm or more and 350 nm or less, more preferably 30 nm or more and 300 nm or less, and still preferably 40 nm or more and 250 nm or less. When the average primary particle diameter of the carbon-coated positive electrode active material is 20 nm or more, an increase in the amount of carbon caused by an excessive increase in specific surface area can be suppressed. On the other hand, when the average primary particle diameter of the carbon-coated positive electrode active material is 350 nm or less, the electron conductivity and the ion diffusion performance can be improved due to a large specific surface area.

In the positive electrode material for lithium-ion secondary batteries according to the embodiment, the average primary particle diameter of the carbon-coated positive electrode active material is calculated from a specific surface area of the carbon-coated positive electrode active material that is measured using a specific surface area meter with a BET method using nitrogen ($N_2$) adsorption.

More specifically, for example, the average primary particle diameter can be obtained by the method which is explained in (3) Average Primary Particle Diameter of Carbon-Coated Positive Electrode Active Material described in EXAMPLES.

That is, the average primary particle diameter of the carbon-coated positive electrode active material may be calculated from Expression (2).

Primary Particle Diameter $A$ (nm)=6/[(True Specific Gravity (g/m$^3$) of Carbon-Coated Positive Electrode Active Material)×(BET specific surface area (m$^2$/g) of Carbon-Coated Positive Electrode Active Material)]×10$^9$ (2)

The true specific gravity of the carbon-coated positive electrode active material in the Expression (2) may be set to 3600000 g/m$^3$.

The specific surface area of the carbon-coated positive electrode active material in the positive electrode material for lithium-ion secondary batteries according to the embodiment is preferably 5 m$^2$/g or more and 80 m$^2$/g or less and more preferably 7 m$^2$/g or more and 40 m$^2$/g or less.

More specifically, for example, the specific surface area of the carbon-coated positive electrode active material can be obtained by the method which is explained in (2) Specific Surface Area of Carbon-Coated Positive Electrode Active Material described in EXAMPLES.

When the specific surface area of the carbon-coated positive electrode active material is 5 m$^2$/g or more, the diffusion rate of lithium ions in the positive electrode material can be increased, and the battery characteristics of the lithium-ion secondary battery can be improved. On the other hand, when the specific surface area of the carbon-coated positive electrode active material is 80 m$^2$/g or less, the electron conductivity can be improved.

In the positive electrode material for lithium-ion secondary batteries according to the embodiment, the average particle diameter of the granulated body produced using the primary particles of the carbon-coated positive electrode active material is preferably 2 μm or more and 30 μm or less, more preferably 2.5 μm or more and 20 μm or less, and still preferably 3 μm or more and 20 μm or less.

In a case where the average particle diameter of the granulated body is 2 μm or more, when the positive electrode material, a conductive auxiliary agent, a binder resin (binder), and a solvent are mixed with each other to prepare a positive electrode material paste for lithium-ion secondary batteries, the mixing amount of the conductive auxiliary agent and the binder can be reduced, and the battery capacity of the lithium-ion secondary battery per unit mass of the positive electrode mixture layer for lithium-ion secondary batteries can be increased. On the other hand, when the average particle diameter of the granulated body is 30 µm or less, the dispersibility and the uniformity of the conductive auxiliary agent or the binder included in the positive electrode mixture layer for lithium-ion secondary batteries can be improved. As a result, in the lithium-ion secondary battery in which the positive electrode material for lithium-ion secondary batteries according to the embodiment is used, the discharge capacity during high-speed charge and discharge can be increased.

The average particle diameter of the granulated body is measured using a laser diffraction particle diameter analyzer after suspending the positive electrode material for lithium-ion secondary batteries according to the embodiment in a dispersion medium in which 0.1% by mass of polyvinyl pyrrolidone is dissolved in water.

In the positive electrode material for lithium-ion secondary batteries according to the embodiment, a ratio (B/A) of a crystallite diameter B (nm) of the positive electrode active material to an average primary particle diameter A (nm) calculated from a specific surface area of the carbon-coated positive electrode active material that is obtained using a BET method is 0.9 or higher and 1.5 or lower, preferably 0.95 or higher and 1.45 or lower, and still more preferably 1.0 or higher and 1.4 or lower.

When the ratio (B/A) is lower than 0.9, a large amount of crystal phase is present in the primary particles, and the diffusibility of lithium deteriorates. As a result, the resistance increases. On the other hand, when the ratio (B/A) is higher than 1.5, the surfaces of the primary particles are coated with a large amount of a porous coating material, the interface resistance of the primary particles increases.

In the positive electrode material for lithium-ion secondary batteries according to the embodiment, the carbon content in the primary particles of the carbon-coated positive electrode active material is preferably 0.5% by mass or more and 3% by mass or less, preferably 0.8% by mass or more and 2% by mass or less, and still more preferably 1% by mass or more and 2% by mass or less.

When the carbon content in the primary particles of the carbon-coated positive electrode active material is 0.5% by mass or more, the electron conductivity can be sufficiently improved. On the other hand, when the carbon content in the primary particles of the carbon-coated positive electrode active material is 3% by mass or less, the electrode density can be improved.

The carbon content in the primary particles of the carbon-coated positive electrode active material is measured using a carbon analyzer (carbon-sulfur analyzer: EMIA-810W (trade name), manufactured by Horiba Ltd.).

In the positive electrode material for lithium-ion secondary batteries according to the embodiment, the coating ratio of the carbon film in the primary particles of the carbon-coated positive electrode active material is preferably 80% or more, more preferably 85% or more, and still more preferably 90% or more.

When the coating ratio of the carbon film in the primary particles of the carbon-coated positive electrode active material is 80% or more, the coating effect of the carbon coating can be sufficiently obtained.

The coating ratio of the carbon film in the primary particles of the carbon-coated positive electrode active material is measured, for example, using a transmission electron microscope (TEM) or an energy dispersive X-ray microanalyzer (EDX).

In the positive electrode material for lithium-ion secondary batteries according to the embodiment, the thickness of the carbon film in the primary particles of the carbon-coated positive electrode active material is preferably 0.5 nm or more and 5 nm or less, more preferably 0.7 nm or more and 4 nm or less, and still preferably 1 nm or more and 3 nm or less.

When the thickness of the carbon film in the primary particles of the carbon-coated positive electrode active material is 0.5 nm or more, the thickness of the carbon film is excessively thin, and thus a carbon film having a desired resistance value can be formed. On the other hand, when the thickness of the carbon film in the primary particles of the carbon-coated positive electrode active material is 5 nm or less, a decrease in the battery capacity per unit mass of the electrode material can be suppressed.

The thickness of the carbon film in the primary particles of the carbon-coated positive electrode active material is measured, for example, using a transmission electron microscope (TEM) or an energy dispersive X-ray microanalyzer (EDX).

The positive electrode material for lithium-ion secondary batteries according to the embodiment may include a component other than the above-described granulated body. Examples of the component other than the granulated body include a binder formed of a binder resin and a conductive auxiliary agent such as carbon black, acetylene black, graphite, Ketjen black, natural graphite, or artificial graphite.

Positive Electrode Active Material

The positive electrode material for lithium-ion secondary batteries according to the embodiment includes, as the positive electrode active material, a material in which a strain calculated by X-ray diffraction (XRD) measurement is 0.01% or higher and 0.1% or lower.

When the positive electrode active material is in which a strain calculated by XRD measurement is lower than 0.01%, the diffusion of lithium is limited to diffusion in only one axial direction, and thus the diffusion resistance increases. On the other hand, when the positive electrode active material is in which a strain calculated by XRD measurement is higher than 0.1%, in a strain portion where charge and discharge is repeated, a crystal constituent element is eluted, and the capacity deteriorates.

Examples of a method of calculating the strain of the positive electrode active material using the XRD measurement include a Williamson-Hall method. By estimating an integral width of each diffraction peak, a crystallite size and a lattice strain can be determined.

More specifically, for example, the strain of the positive electrode active material can be obtained by the method which is explained in (1) Strain of Positive Electrode Active Material and Crystallite Diameter of Positive Electrode Active Material described in EXAMPLES.

For example, using a diffraction peak in a range of $2\theta=15°$ to $75°$ obtained by the X-ray diffraction of the positive electrode material, the strain and the crystallite diameter of the positive electrode active material may be estimated from a slope and an intercept of a line according to Expression (1) using Williamson-Hall method.

$$\beta \cos \theta = C\epsilon \sin \theta + K\lambda/L \quad (1)$$

(In the expression (1), $\theta$ may represent a Bragg angle; $\beta$ may represent an integral width which corresponds to a width of a rectangle having the same height and the same area of the diffraction peak; ε may represent the strain; L may represent the crystallite diameter B; λ may represent a radiation wavelength, and C and K may represent constants of 4 and 0.9).

It is preferable that the positive electrode active material include an olivine positive electrode active material.

The olivine positive electrode active material is formed of a compound represented by Formula $Li_xA_yD_zPO_4$ (where A represents at least one selected from the group consisting of Co, Mn, Ni, Fe, Cu, and Cr, D represents at least one selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).

From the viewpoints of high discharge capacity and high energy density, it is preferable that the positive electrode active material satisfies $0.9<x<1.1$, $0<y\leq1$, $0\leq z<1$, and $0.9<y+z<1.1$ in $Li_xA_yD_zPO_4$.

From the viewpoint that a positive electrode mixture layer that can realize high discharge potential and high safety, Co, Mn, Ni, or Fe is preferable as A, and Mg, Ca, Sr, Ba, Ti, Zn, or Al is preferable as D.

The crystallite diameter of the olivine positive electrode active material is preferably 30 nm or more and 300 nm or less and more preferably 50 nm or more and 250 nm or less.

When the crystallite diameter of the olivine positive electrode active material is less than 30 nm, a large amount of carbon is required to sufficiently coat the surface of the positive electrode active material with the pyrolytic carbon film. In addition, since a large amount of a binder is required, the amount of the positive electrode active material in the positive electrode decreases, and the battery capacity may decrease. Likewise, the carbon film may peel off due to an insufficient binding strength. On the other hand, when the crystallite diameter of the olivine positive electrode active material is more than 300 nm, the internal resistance of the positive electrode active material excessively increases, and thus when a battery is formed, the discharge capacity in the high charge-discharge rate may decrease. In addition, when charge and discharge is repeated, an intermediate phase is likely to be formed, and a constituent element is eluted from the intermediate phase. As a result, the capacity decreases.

As a method of calculating the crystallite diameter of the olivine positive electrode active material, the crystallite diameter can be determined by analyzing a powder X-ray diffraction pattern obtained by X-ray diffraction measurement using a Williamson-Hall method.

More specifically, for example, the crystallite diameter of the positive electrode active material can be obtained by the method which is explained in (1) Strain of Positive Electrode Active Material and Crystallite Diameter of Positive Electrode Active Material described in EXAMPLES.

Carbon Film

The carbon film is a pyrolytic carbon film that is obtained by carbonizing an organic compound as a raw material. It is preferable that a carbon source that is a raw material of the carbon film is derived from an organic compound in which the purity of carbon is 40.00% or higher and 60.00% or lower.

In the positive electrode material for lithium-ion secondary batteries according to the embodiment, as a method of calculating "purity of carbon" in the carbon source that is a raw material of the carbon film, when plural kinds of organic compounds are used, a method of calculating and adding the amounts of carbon (% by mass) in the mixing amounts of the respective organic compounds based on the mixing amounts (% by mass) of the respective organic compounds and the known purities (%) of carbon and calculating the "purity of carbon" in the carbon source from the following Formula (1) based on the total mixing amount (% by mass) and the total amount of carbon (% by mass of the organic compounds is used.

Purity of Carbon (%)=Total amount of Carbon (% by mass)/Total Mixing Amount (% by mass)× 100     (1)

The positive electrode material for lithium-ion secondary batteries according to the embodiment includes a carbon-coated positive electrode active material that includes primary particles, secondary particles, and a carbon film, the primary particles being formed of a positive electrode active material in which a strain calculated by X-ray diffraction measurement is 0.01% or higher and 0.1% or lower, the secondary particles being agglomerates of the primary particles, and the carbon film coating the primary particles of the positive electrode active material and the secondary particles as the agglomerates of the primary particles, in which a ratio (B/A) of a crystallite diameter B (nm) of the positive electrode active material to an average primary particle diameter A (nm) calculated from a specific surface area of the carbon-coated positive electrode active material that is obtained using a BET method is 0.9 or higher and 1.5 or lower. Therefore, a lithium-ion secondary battery having a low diffusion resistance of lithium can be provided.

Method of Producing Electrode Material for Lithium-Ion Secondary Batteries

A method of producing the electrode material for lithium-ion secondary batteries according to the embodiment is not particularly limited, and examples thereof include a method including: a step of preparing a dispersion by mixing $Li_xA_yD_zPO_4$ particles and an organic compound with each other and dispersing the mixture; a step of obtaining a dry material by drying the dispersion; a step of calcinating the dry material in a non-oxidative atmosphere to obtain a granulated body that is produced using primary particles of a carbon-coated electrode active material; and a step of mixing the obtained granulated body with an oxide electrode active material.

The $Li_xA_yD_zPO_4$ particles are not particularly limited and are preferably obtained using, for example, a method including: introducing a Li source, an A source, a D source, and a $PO_4$ source into water such that a molar ratio x:y+z thereof is 1:1; stirring the components to obtain a $Li_xA_yD_zPO_4$ precursor solution; stirring and mixing the precursor solution at 15° C. or higher 70° C. or lower for 1 hour or longer and 20 hours or shorter to prepare a hydration precursor solution; putting this hydration precursor solution into a pressure-resistant container; and performing a hydrothermal treatment at a high temperature and a high pressure, for example, at 130° C. or higher and 190° C. or lower and 0.2 MPa or higher for 1 hour or longer and 20 hours or shorter.

In this case, by adjusting the temperature and the time during the stirring of the hydration precursor solution and the temperature, the pressure, and the time during the hydrothermal treatment, the particle diameter of the $Li_xA_yD_zPO_4$ particles can be controlled to be a desired diameter.

In this case, as the Li source, for example, at least one selected from the group consisting of a lithium inorganic acid salt such as lithium hydroxide (LiOH), lithium carbonate ($Li_2CO_3$), lithium chloride (LiCl), or Lithium phosphate ($Li_3PO_4$) and a lithium organic acid salt such as lithium acetate ($LiCH_3COO$) or lithium oxalate ($(COOLi)_2$).

Among these, lithium chloride or lithium acetate is preferable from the viewpoint of obtaining a uniform solution phase.

Here, as the A source, at least one selected from the group consisting of a Co source formed of a cobalt compound, a Mn source formed of a manganese compound, a Ni source formed of a nickel compound, a Fe source formed of an iron compound, a Cu source formed of a copper compound, and a Cr source formed of a chromium compound is preferable. In addition, as the D source, at least one selected from the group consisting of a Mg source formed of a magnesium compound, a Ca source formed of a calcium compound, a Sr source formed of a strontium compound, a Ba source formed of a barium compound, a Ti source formed of a titanium compound, a Zn source formed of a zinc compound, a B source formed of a boron compound, an Al source formed of an aluminum compound, a Ga source formed of a gallium compound, an In source formed of an indium compound, a Si source formed of a silicon compound, a Ge source formed of a germanium compound, a Sc source formed of a scandium compound, and a Y source formed of a yttrium compound is preferable.

As the $PO_4$ source, for example, at least one selected from the group consisting of yellow phosphorus, red phosphorus, phosphoric acids such as orthophosphoric acid ($H_3PO_4$) or metaphosphoric acid ($HPO_3$), ammonium dihydrogen phosphate ($NH_4H_2PO_4$), diammonium hydrogen phosphate (($NH_4)_2HPO_4$), ammonium phosphate (($NH_4)_3PO_4$), lithium phosphate ($Li_3PO_4$), dilithium hydrogen phosphate ($Li_2HPO_4$), lithium dihydrogen phosphate ($LiH_2PO_4$), and hydrates thereof is preferable.

In particular, orthophosphoric acid is preferable from the viewpoint of easily forming a uniform solution phase.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, and polyols.

Examples of the polyols include polyethylene glycol, polypropylene glycol, polyglycerin, and glycerin.

The organic compound may be mixed such that the content rate of carbon in the organic compound is 0.5 part by mass or more and 2.5 parts by mass or less with respect to 100 parts by mass of the $Li_xA_yD_zPO_4$ particles.

Next, the obtained mixed liquid is dispersed to obtain a dispersion.

A dispersion method is not particularly limited and it is preferable to use a device capable of disentangling the agglomerated state of the $Li_xA_yD_zPO_4$ particles. Examples of the disperser include a ball mill, a sand mill, and a planetary mixer. In particular, by using a continuous disperser, sampling can be performed during the dispersion, and an endpoint can be easily determined using a span value.

Next, the dispersion is dried to obtain a dry material.

In this step, a drying method is not particularly limited as long as a solvent (water) can be removed from the dispersion.

In order to prepare agglomerated particles, the dispersion is dried using a spray drying method. For example, a method of spraying the dispersion in a high temperature atmosphere at 100° C. or higher and 300° C. or lower to obtain a particulate dry material or a granular dry material can be used.

Next, the dry material is calcinated in a non-oxidative atmosphere in a temperature range of 700° C. or higher and 1000° C. or lower and preferably 800° C. or higher and 900° C. or lower.

As the non-oxidative atmosphere, an inert atmosphere such as nitrogen ($N_2$) or argon (Ar) is preferable, and when it is desired to further suppress oxidation, a reducing atmosphere including reducing gas such as hydrogen ($H_2$) is preferable.

Here, the reason why the calcination temperature of the dry material is 700° C. or higher and 1000° C. or lower is that, it is not preferable that the calcination temperature is lower than 700° C. because the decomposition reaction of the organic compound included in the dry material do not sufficiently progress, the carbonization of the organic compound is insufficient, and the produced decomposition reaction product is a high-resistance organic decomposition product. On the other hand, when the calcination temperature is higher than 1000° C., a component constituting the dry material, for example, lithium (Li) is evaporated such that the composition deviates, particle growth in the dry material is promoted, the discharge capacity at a high charge-discharge rate decreases, and it is difficult to realize sufficient charge and discharge rate performance. In addition, impurities are produced, and these impurities cause deterioration in capacity when charge and discharge is repeated.

The calcination time is not particularly limited as long as the organic compound can be sufficiently carbonized. For example, the calcination time is 0.1 hours or longer and 10 hours or shorter.

Through the calcination, a granulated body that is produced using the primary particles of the carbon-coated electrode active material can be obtained.

Next, the obtained granulated body is mixed with the oxide electrode active material at a predetermined ratio to obtain the electrode material for lithium-ion secondary batteries according to the embodiment.

A method of mixing the granulated body and the oxide electrode active material with each other is not particularly limited and it is preferable to use a device capable of uniformly mixing the granulated body and the oxide electrode active material with each other. Examples of the device include a ball mill, a sand mill, and a planetary mixer.

In the method of producing a positive electrode material for lithium-ion secondary batteries according to the embodiment, the state of strains can be controlled by controlling a state where the positive electrode active material is dissolved and reprecipitated during the hydrothermal synthesis. The dissolved and reprecipitated state can be controlled by controlling the hydration state of the precursor and the temperature and the time during the hydrothermal synthesis. By stirring the components at a temperature suitable for a reaction product to change the hydration state, the primary particles of the positive electrode active material having suitable strains can be formed during the hydrothermal synthesis, and particles having the strains can be obtained even after being processed as an electrode material.

Positive Electrode for Lithium-Ion secondary Batteries

The positive electrode for lithium-ion secondary batteries according to the embodiment includes: an electrode current collector; and a positive electrode mixture layer (electrode) that is formed on the electrode current collector, in which the positive electrode mixture layer includes the positive electrode material for lithium-ion secondary batteries according to the embodiment.

That is, in the positive electrode for lithium-ion secondary batteries according to the embodiment, the positive electrode mixture layer is formed on one main surface of the electrode current collector using the positive electrode material for lithium-ion secondary batteries according to the embodiment.

A method of manufacturing the positive electrode for lithium-ion secondary batteries according to the embodiment is not particularly limited as long as the positive electrode mixture layer can be formed on one main surface of the electrode current collector using the positive electrode material for lithium-ion secondary batteries according to the embodiment. Examples of the method of manufacturing the positive electrode for lithium-ion secondary batteries according to the embodiment include the following method.

First, the positive electrode material for lithium-ion secondary batteries according to the embodiment, a binder, a conductive auxiliary agent, and a solvent are mixed with each other to prepare a positive electrode material paste for lithium-ion secondary batteries.

Binder

As the binder, that is, as a binder resin, for example, a polytetrafluoroethylene (PTFE) resin, a polyvinylidene fluoride (PVdF) resin, or a fluororubber is preferably used.

When the total mass of the positive electrode material for lithium-ion secondary batteries according to the embodiment, the binder, and the conductive auxiliary agent is represented by 100% by mass, the content rate of the binder in the positive electrode material paste for lithium-ion secondary batteries is preferably 1% by mass or more and 10% by mass or less and more preferably 2% by mass or more and 6% by mass or less.

Conductive Auxiliary Agent

The conductive auxiliary agent is not particularly limited, and for example, at least one selected from the group acetylene black, Ketjen black, Furnace black, and filamentous carbon such as vapor-grown carbon fiber (VGCF) or carbon nanotube is used.

When the total mass of the positive electrode material for lithium-ion secondary batteries according to the embodiment, the binder, and the conductive auxiliary agent is represented by 100% by mass, the content rate of the conductive auxiliary agent in the positive electrode material paste for lithium-ion secondary batteries is preferably 1% by mass or more and 15% by mass or less and more preferably 3% by mass or more and 10% by mass or less.

Solvent

The solvent may be appropriately added to the positive electrode material paste for lithium-ion secondary batteries including the positive electrode material for lithium-ion secondary batteries according to the embodiment so as to easily coat a coating object such as the electrode current collector with the paste.

A solvent used in a coating material for forming an electrode or a paste for forming an electrode may be appropriately selected depending on the characteristics of the binder resin.

Examples of the solvent include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetyl acetone, and cyclohexanone; amides such as dimethylformamide, N,N-dimethylacetoacetamide, and N-methylpyrrolidone; and glycols such as ethylene glycol, diethylene glycol, and propylene glycol. Among these solvents, one kind may be used alone, or a mixture of two or more kinds may be used.

When the total mass of the positive electrode material for lithium-ion secondary batteries according to the embodiment, the binder, and the solvent is represented by 100 parts by mass, the content rate of the solvent in the positive electrode material paste for lithium-ion secondary batteries is preferably 60 parts by mass or more and 400 parts by mass or less and more preferably 80 parts by mass or more and 300 parts by mass.

By controlling the content of the solvent to be in the above-described range, the positive electrode material paste for lithium-ion secondary batteries having good electrode formability and good battery characteristics can be obtained.

A method of mixing the positive electrode material for lithium-ion secondary batteries according to the embodiment, the binder, the conductive auxiliary agent, and the solvent with each other is not particularly limited as long as it is a method capable of uniformly mixing the components. For example, a method of using a kneader such as a ball mill, a sand mill, a planetary mixer, a paint shaker, or a homogenizer can be used.

Next, one main surface of the electrode current collector is coated with the positive electrode material paste for lithium-ion secondary batteries to form a film thereon, and this coating film is dried and compressed. As a result, the positive electrode for lithium-ion secondary batteries in which the positive electrode mixture layer is formed on the main surface of the electrode current collector can be obtained.

The positive electrode for lithium-ion secondary batteries according to the embodiment includes the positive electrode material for lithium-ion secondary batteries according to the embodiment. Therefore, an electrolytic solution is likely to penetrate into the granulated body included in the positive electrode for lithium-ion secondary batteries, and a positive electrode for lithium-ion secondary batteries in which the electron conductivity and the ion conductivity are realized and the energy density is improved can be provided.

Lithium-Ion Secondary Battery

The lithium-ion secondary battery according to the embodiment includes a positive electrode, a negative electrode, and a non-aqueous electrolyte, in which the positive electrode for lithium-ion secondary batteries according to the embodiment is provided as the positive electrode.

In the lithium-ion secondary battery according to the embodiment, the negative electrode, the non-aqueous electrolyte, the separator, and the like are not particularly limited.

The negative electrode can be formed of, for example, a negative electrode material such as metal Li, a carbon material, a Li alloy, or $Li_4Ti_5O_{12}$.

In addition, a solid electrolyte may be used instead of the non-aqueous electrolyte and the separator.

The non-aqueous electrolyte can be prepared by mixing ethylene carbonate (EC) and ethyl methyl carbonate (EMC) with each other at a volume ratio of 1:1 to obtain a mixed solvent, and dissolving lithium hexafluorophosphate ($LiPF_6$) in the obtained mixed solvent such that the concentration thereof is, for example, 1 mol/dm³. As the separator, for example, porous propylene can be used.

The lithium-ion secondary battery according to the embodiment includes the positive electrode for lithium-ion secondary batteries according to the embodiment. Therefore, the discharge capacity is high, and the charge-discharge direct current resistance is low.

EXAMPLES

Hereinafter, the present invention will be described in detail using Examples and Comparative Examples, but is not limited to the following examples.

Production Example 1

Production of Positive Electrode Active Material (LiFePO$_4$)

Lithium hydroxide (LiOH) was used as a Li source, ammonium dihydrogen phosphate (NH$_4$H$_2$PO$_4$) was used as a P source, and iron (II) sulfate heptahydrate (FeSO$_4$.7H$_2$O) was used as a Fe source.

Lithium hydroxide, ammonium dihydrogen phosphate, and iron (II) sulfate heptahydrate were mixed with pure water such that amass ratio Li:Fe:P=3:1:1 and the total amount thereof was 200 mL. As a result, a uniform slurry-like mixture was prepared.

Next, this mixed liquid is stirred at 35° C. for 10 hours such that the slurry mixture was sufficiently hydrated.

Next, this mixture was accommodated in a pressure-resistant airtight container having a volume of 500 mL, and hydrothermal synthesis was performed at 170° C. for 12 hour.

After the reaction, the reaction solution was cooled to room temperature (25° C.), and a precipitated cake reaction product was obtained.

Next, this precipitate (reaction product) was sufficiently cleaned with distilled water, and pure water was added to prevent drying and to maintain the water content at 30%. As a result, a cake-like material was obtained.

A small amount of the cake-like material was collected and was dried in a vacuum state at 70° C. for 2 hours to obtain powder. The powder was analyzed by X-ray diffraction measurement (X-ray diffractometer: RINT 2000, manufactured by Rigaku Corporation). As a result, it was verified that single-phase LiFePO$_4$ was formed.

Production Example 2

Production of Positive Electrode Active Material (LiFePO$_4$)

An electrode active material was synthesized using the same method as that of Production Example 1, except that the hydration temperature of the slurry mixture was set as 80° C.

Production Example 3

Production of Positive Electrode Active Material (LiFePO$_4$)

An electrode active material was synthesized using the same method as that of Production Example 1, except that the hydration temperature of the slurry mixture was set as 5° C.

Production Example 4

Production of Positive Electrode Active Material (LiFePO$_4$)

An electrode active material was synthesized using the same method as that of Production Example 1, except that the hydration synthesis temperature of the slurry mixture was set as 200° C.

Production Example 5

Production of Positive Electrode Active Material (LiFePO$_4$)

An electrode active material was synthesized using the same method as that of Production Example 1, except that the hydration synthesis temperature of the slurry mixture was set as 110° C.

Example 1

20 g of LiFePO$_4$ (electrode active material) obtained in Production Example 1 and 0.73 g of sucrose as a carbon source were mixed with water such that the total amount was 100 g. As a result, a mixed liquid was prepared. 150 g of zirconia beads having a diameter of 0.1 mm as medium particles were added to the mixed liquid and were dispersed using a beadmill. As a result, a slurry (mixture) was obtained. Next, the obtained slurry was dried and granulated using a spray dryer such that the drying outlet temperature was 60° C. As a result, a granulated powder was obtained. Next, a heat treatment was performed on the granulated powder using a tube furnace at a temperature of 770° C. for 2 hours. As a result, a positive electrode material according to Example 1 formed of a carbon-coated electrode active material was obtained.

Example 2

A positive electrode material according to Example 2 formed of a carbon-coated electrode active material was obtained using the same method as that of Example 1, except that 0.5 parts by mass of polyvinyl alcohol with respect to 100 parts by mass of the granulated powder was added, stirred, and mixed in the heat treatment.

Example 3

A positive electrode material according to Example 3 formed of a carbon-coated electrode active material was obtained using the same method as that of Example 1, except that the heat treatment temperature was set as 700° C.

Example 4

A positive electrode material according to Example 4 formed of a carbon-coated electrode active material was obtained using the same method as that of Example 1, except that the heat treatment temperature was set as 825° C.

Comparative Example 1

A positive electrode material according to Comparative Example 1 formed of a carbon-coated electrode active material was obtained using the same method as that of Example 1, except that LiFePO$_4$ (electrode active material) obtained in Production Example 2 was used.

Comparative Example 2

A positive electrode material according to Comparative Example 2 formed of a carbon-coated electrode active material was obtained using the same method as that of Example 1, except that LiFePO$_4$ (electrode active material) obtained in Production Example 3 was used.

Comparative Example 3

A positive electrode material according to Comparative Example 3 formed of a carbon-coated electrode active material was obtained using the same method as that of Example 1, except that LiFePO$_4$ (electrode active material) obtained in Production Example 4 was used.

Comparative Example 4

A positive electrode material according to Comparative Example 4 formed of a carbon-coated electrode active material was obtained using the same method as that of Example 1, except that LiFePO$_4$ (electrode active material) obtained in Production Example 5 was used.

Preparation of Lithium Ion Battery

The positive electrode materials obtained in each of Examples 1 to 4 and Comparative Examples 1 to 4, polyvinylidene fluoride (PVdF) as a binder, and acetylene black (AB) as a conductive auxiliary agent were added to N-methyl-2-pyrrolidinone (NMP) such that amass ratio (positive electrode material:AB:PVdF) thereof in the paste was 90:5:5, and the components were mixed with each other to prepare a positive electrode material paste.

Next, this positive electrode material paste was applied to a surface of aluminum foil (electrode current collector) having a thickness of 30 μm to form a coating film, and this coating film was dried to form a positive electrode mixture layer on the surface of the aluminum foil. Next, the positive electrode mixture layer was pressed such that a predetermined density was obtained. As a result, an electrode plate for a positive electrode was obtained.

Using a forming machine, the obtained electrode plate for a positive electrode was punched into a plate shape including a positive electrode mixture layer having a 3 cm (length)×3 cm (width) rectangular shape (electrode area: 9 cm$^2$) and a space for a tab.

Next, an electrode tab was welded to the space for a tap of the electrode plate to prepare a test electrode (positive electrode).

On the other hand, as a counter electrode, a coated electrode that was also coated with carbon was used.

As a separator, a porous polypropylene membrane was adopted.

In addition, as a non-aqueous electrolytic solution, a 1 mol/L lithium hexafluorophosphate (LiPF6) solution was used. As a solvent used in this LiPF$_6$ solution, a solvent obtained by mixing ethylene carbonate and diethyl carbonate at a volume percentage of 1:1 and adding 2% of vinylene carbonate as an additive was used.

Using the test electrode prepared as described above, the counter electrode, and the non-aqueous electrolytic solution, a laminated cell was prepared and was set as a battery according to each of Examples 1 to 4 and Comparative Examples 1 to 4.

Evaluation of Positive Electrode Material

The positive electrode material obtained in each of Examples 1 to 4 and Comparative Examples 1 to 4 and components included in the positive electrode material were evaluated. Evaluation methods are as follows. The results are shown in Table 1.

(1) Strain of Positive Electrode Active Material and Crystallite Diameter of Positive Electrode Active Material The strain of the positive electrode active material was calculated by XRD measurement.

Hereinafter, the details of a method of measuring the strain of the positive electrode active material will be described.

In "Acta Metallurgica, 1, 22 to 31 (1953)", Williamson and Hall proposed a method of extracting information regarding the size (crystallite diameter) and strain of crystallites from an integral width of a diffraction peak in X-ray diffraction. This method is based on an approximate relationship between a Bragg angle (θ) and peak broadening arising from the crystallite diameter and lattice strain. This approximate relationship is represented by the following numerical Expression (1).

$$\beta \cos \theta = C\varepsilon \sin \theta + K\lambda/L \quad (1)$$

In Expression (1), β represents the integral width of a peak, ε represents the lattice strain, L represents the crystallite diameter, λ represents a radiation wavelength, and C and K represent constants taken as 4 and 0.9, respectively, in many cases.

By considering the product of the integral width (β) and cos θ as a function of sin θ, the lattice strain and the crystallite diameter can be estimated from the slope (inclination) and the intercept of a line which is provided according to Expression (1). The integral width (β) corresponds to the width of a rectangle having the same height (maximum intensity) and the same area (integral intensity) of the selected diffraction peak. This area can be approximately by a trapezoidal rule, and the height can be easily obtained from raw data of the diffraction pattern. Therefore, using this Williamson-Hall (W-H) method, the integral width of each diffraction peak can be estimated, and the crystallite size and lattice strain can be further determined.

Using the W-H method, the crystallite diameter and the strain of the electrode active material were calculated from peaks detected in a range of 2θ=15° to 75°.

(2) Specific Surface Area of Carbon-Coated Positive Electrode Active Material

Using a specific surface area/pore distribution measuring device (trade name: BELSORP-mini, manufactured by MicrotracBEL Corp.), the specific surface area of the positive electrode active material was measured using gas adsorption.

(3) Average Primary Particle Diameter of Carbon-Coated Positive Electrode Active Material An average primary particle diameter A of the carbon-coated positive electrode active material was calculated from the following Expression (2).

Primary Particle Diameter $A$ (nm)=6/[(True Specific Gravity (g/m$^3$) of Carbon-Coated Positive Electrode Active Material)×(BET specific surface area (m$^2$/g) of Carbon-Coated Positive Electrode Active Material)]×10$^9$ \quad (2)

The true specific gravity of the carbon-coated positive electrode active material was 3600000 g/m$^3$.

Using a specific surface area meter (for example, trade name: BELSORP-mini, manufactured by MicrotracBEL Corp.), the BET specific surface area was measured with a BET method.

(4) Ratio (B/a) of Crystallite Diameter B (nm) of Positive Electrode Active Material to Average Primary Particle Diameter A (nm) of Carbon-Coated Positive Electrode Active Material A ratio (B/A) was calculated from the results of (1) and (3) described above.

Evaluation of Lithium-Ion Secondary Battery

Using the lithium-ion secondary battery obtained in each of Examples 1 to 4 and Comparative Examples 1 to 4, the discharge capacity and the cycle retention were measured. Evaluation methods are as follows. The results are shown in Table 1.

(1) Discharge Capacity

At an environmental temperature of 25° C., the cut-off voltage was set as 2.5 V-3.7 V (vs carbon negative electrode), the charge current was set as 1 C, and the discharge current was set as 3 C. Under these conditions, the discharge capacity of the lithium-ion secondary battery was measured by constant-current charging and discharging.

(2) Cycle Characteristics

At an environmental temperature of 60° C., the cut-off voltage was set as 2.5 V-3.7 V (vs carbon negative electrode), the charge current was set as 1 C, the discharge current was set as 1 C, and 500 cycles of constant-current charging and discharging were repeated. Under these conditions, the cycle characteristics were measured from Cycle Retention=(Discharge Capacity of 500th Cycle/Discharge Capacity of First Cycle).

TABLE 1

|  | Crystal strain (%) | Specific Surface Area | Primary Particle Diameter (nm) A Calculated from Specific surface Area | Crystallite Diameter (nm) B | B/A | 3 C Discharge Capacity (mAh/g) | Cycle Retention (%) |
| --- | --- | --- | --- | --- | --- | --- | --- |
| Example 1 | 0.06 | 15.3 | 108.9 | 152 | 1.4 | 140 | 82.0 |
| Example 2 | 0.05 | 16.5 | 101.0 | 145 | 1.4 | 138 | 81.0 |
| Example 3 | 0.08 | 15.5 | 107.5 | 95 | 0.9 | 136 | 84.0 |
| Example 4 | 0.03 | 15.1 | 110.4 | 165 | 1.5 | 130 | 78.0 |
| Comparative Example 1 | 0.005 | 14.8 | 112.6 | 180 | 1.6 | 110 | 70.0 |
| Comparative Example 2 | 0.11 | 15.6 | 106.8 | 91 | 0.9 | 120 | 74.0 |
| Comparative Example 3 | 0.02 | 8.5 | 196.1 | 350 | 1.8 | 95 | 72.0 |
| Comparative Example 4 | 0.09 | 15.9 | 104.8 | 25 | 0.2 | 115 | 68.0 |

In the results of Table 1, in Examples 1 to 4, the discharge capacity increased, and the cycle retention was also improved.

On the other hand, in Comparative Examples 1 to 4, the discharge capacity decreased, and the cycle retention decreased.

That is, when Examples 1 to 4 were compared to Comparative Examples 1 to 4, it was found that the discharge capacity was high and the cycle retention was high.

The positive electrode material for lithium-ion secondary batteries according to the present invention includes a carbon-coated positive electrode active material that includes primary particles, secondary particles, and a carbon film, the primary particles being formed of a positive electrode active material in which a strain calculated by X-ray diffraction measurement is 0.01% or higher and 0.1% or lower, the secondary particles being agglomerates of the primary particles, and the carbon film coating the primary particles of the positive electrode active material and the secondary particles as the agglomerates of the primary particles, in which a ratio (B/A) of a crystallite diameter B (nm) of the positive electrode active material to an average primary particle diameter A (nm) calculated from a specific surface area of the carbon-coated positive electrode active material that is obtained using a BET method is 0.9 or higher and 1.5 or lower. Therefore, the lithium-ion secondary battery is applicable to the next-generation secondary battery in which high voltage, high energy density, high load characteristics, and high-speed charge and discharge characteristics are expected. In the case of the next-generation secondary battery, the effects are significant.

The invention claimed is:

1. A positive electrode material for lithium-ion secondary batteries, wherein
the positive electrode material includes a carbon-coated positive electrode active material;
the carbon-coated positive electrode active material comprises primary particles, secondary particles which are agglomerates of the primary particles, and a carbon film, wherein the primary particles and the secondary particles are coated with the carbon film;
the primary particles consists of a positive electrode active material in which a strain of the positive electrode active material, which is calculated by X-ray diffraction measurement, is 0.01% or higher and 0.1% or lower; and
a ratio (B/A) of a crystallite diameter B (nm) of the positive electrode active material to an average primary particle diameter A (nm) of the carbon-coated positive electrode active material is 0.9 or higher and 1.5 or lower, wherein the average primary particle diameter A is calculated from a specific surface area of the carbon-coated positive electrode active material, and the specific surface area is a value obtained by a BET method.

2. The positive electrode material for lithium-ion secondary batteries according to claim 1,
wherein the crystallite diameter of the positive electrode active material is 30 nm or more and 300 nm or less.

3. The positive electrode material for lithium-ion secondary batteries according to claim 1,
wherein the positive electrode active material is represented by general formula $Li_xA_yD_zPO_4$ (where A represents at least one selected from the group consisting of Co, Mn, Ni, Fe, Cu, and Cr, D represents at least one selected from the group consisting of Mg, Ca, Sr, Ba, Ti, Zn, B, Al, Ga, In, Si, Ge, Sc, and Y, $0.9 < x < 1.1$, $0 < y \le 1$, $0 \le z < 1$, and $0.9 < y+z < 1.1$).

4. The positive electrode material for lithium-ion secondary batteries according to claim 1, wherein, using a diffraction peak in a range of $2\theta = 15°$ to $75°$ obtained by the X-ray diffraction of the positive electrode material, the strain and the crystallite diameter B of the positive electrode active material are estimated from a slope and an intercept of a line according to Expression (1) using Williamson-Hall method, $$\beta \cos \theta = C\varepsilon \sin \theta + K\lambda/L \qquad (1)$$

(in the expression (1), $\theta$ represents a Bragg angle; $\beta$ represents an integral width which corresponds to a width of a rectangle having the same height and the same area of the diffraction peak; $\varepsilon$ represents the strain; L represents the crystallite diameter B; $\lambda$ represents a radiation wavelength, and C and K represent constants of 4 and 0.9).

5. The positive electrode material for lithium-ion secondary batteries according to claim 1, wherein the average primary particle diameter A of the carbon-coated positive electrode active material is calculated from Expression (2), primary Particle Diameter $A$ (nm)=6/[(True Specific Gravity (g/m$^3$) of Carbon-Coated Positive Electrode Active Material)×(BET specific surface area (m$^2$/g) of Carbon-Coated Positive Electrode Active Material)]×10$^9$ (2)

wherein the true specific gravity of the carbon-coated positive electrode active material in the Expression (2) is set to 3600000 g/m$^3$.

6. A positive electrode for lithium-ion secondary batteries, wherein the positive electrode comprising:

an electrode current collector; and a positive electrode mixture layer that is formed on the electrode current collector, wherein the positive electrode mixture layer includes the positive electrode material for lithium-ion secondary batteries according to claim 1.

7. A lithium-ion secondary battery comprising:

a positive electrode;

a negative electrode; and a non-aqueous electrolyte, wherein the positive electrode for lithium-ion secondary batteries according to claim 6 is provided as the positive electrode.

* * * * *